(12) United States Patent
Muszinski et al.

(10) Patent No.: US 11,897,744 B2
(45) Date of Patent: Feb. 13, 2024

(54) BEVERAGE BOTTLE FILLING MACHINE AND A METHOD OF FILLING BEVERAGE BOTTLES AND SIMILAR CONTAINERS

(71) Applicant: KHS GMBH, Dortmund (DE)

(72) Inventors: Olaf Muszinski, Kelkheim (DE); Thomas Stolte, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 17/171,530

(22) Filed: Feb. 9, 2021

(65) Prior Publication Data

US 2021/0163277 A1 Jun. 3, 2021

Related U.S. Application Data

(63) Continuation-in-part of application No. PCT/EP2019/063315, filed on May 23, 2019.

(30) Foreign Application Priority Data

Aug. 10, 2018 (DE) .......................... 102018119550.8

(51) Int. Cl.

| | | |
|---|---|---|
| B67C 7/00 | (2006.01) | |
| B67C 3/22 | (2006.01) | |
| B67C 3/02 | (2006.01) | |
| B67C 3/06 | (2006.01) | |
| B67C 3/26 | (2006.01) | |
| B29C 49/06 | (2006.01) | |
| B29C 49/10 | (2006.01) | |
| B29K 67/00 | (2006.01) | |
| B29L 31/00 | (2006.01) | |

(52) U.S. Cl.
CPC .............. *B67C 3/225* (2013.01); *B67C 3/023* (2013.01); *B67C 3/06* (2013.01); *B67C 3/2614* (2013.01); *B67C 7/004* (2013.01); *B67C 7/0026* (2013.01); *B29C 49/06* (2013.01); *B29C 49/10* (2013.01); *B29K 2067/003* (2013.01); *B29L 2031/7158* (2013.01); *B67C 2003/227* (2013.01); *B67C 2007/006* (2013.01); *B67C 2007/0066* (2013.01)

(58) Field of Classification Search
CPC .. B67C 3/06; B67C 3/10; B67C 3/208; B67C 3/225; B67C 3/023; B67C 2003/227; B67C 2007/006; B29C 49/64
USPC ........................................... 53/426, 432, 452
See application file for complete search history.

(56) References Cited

U.S. PATENT DOCUMENTS

| | | | | |
|---|---|---|---|---|
| 2,372,899 | A * | 4/1945 | Kantor ...................... | B67C 3/26 141/147 |
| 5,642,761 | A | 7/1997 | Holbrook | |
| 5,996,322 | A * | 12/1999 | La Barre ................. | B65B 3/022 425/526 |
| 2009/0236007 | A1* | 9/2009 | Clusserath ................ | B65B 3/26 141/198 |
| 2012/0012227 | A1 | 1/2012 | Schubert et al. | |

(Continued)

FOREIGN PATENT DOCUMENTS

| | | |
|---|---|---|
| CN | 101547834 A | 9/2009 |
| DE | 102012104267 | 11/2013 |

(Continued)

*Primary Examiner* — Jacob A Smith

(74) *Attorney, Agent, or Firm* — Laurence A. Greenberg; Werner H. Stemer; Ralph E. Locher

(57) ABSTRACT

A beverage bottle filling machine and a method of filling beverage bottles and similar containers.

17 Claims, 6 Drawing Sheets

(56) References Cited

U.S. PATENT DOCUMENTS

| | | | | |
|---|---|---|---|---|
| 2015/0114517 A1* | 4/2015 | Clusserath | ............. | B65B 43/59 |
| | | | | 141/172 |
| 2015/0128531 A1* | 5/2015 | Auburger | ................ | B67C 3/023 |
| | | | | 53/574 |
| 2018/0127252 A1* | 5/2018 | Bulunmaz | ................. | A23L 2/54 |
| 2018/0354768 A1* | 12/2018 | Muszinski | ............. | B67C 3/007 |
| 2019/0389710 A1* | 12/2019 | Hayakawa | ................ | B67C 3/02 |
| 2020/0277179 A1* | 9/2020 | Comin | .................. | B67C 3/2614 |

FOREIGN PATENT DOCUMENTS

| | | | | |
|---|---|---|---|---|
| DE | 102015120768 A1 | 6/2017 | | |
| JP | 2018122915 A * | 8/2018 | .............. | B67C 3/02 |
| WO | 2017093078 | 6/2017 | | |

\* cited by examiner

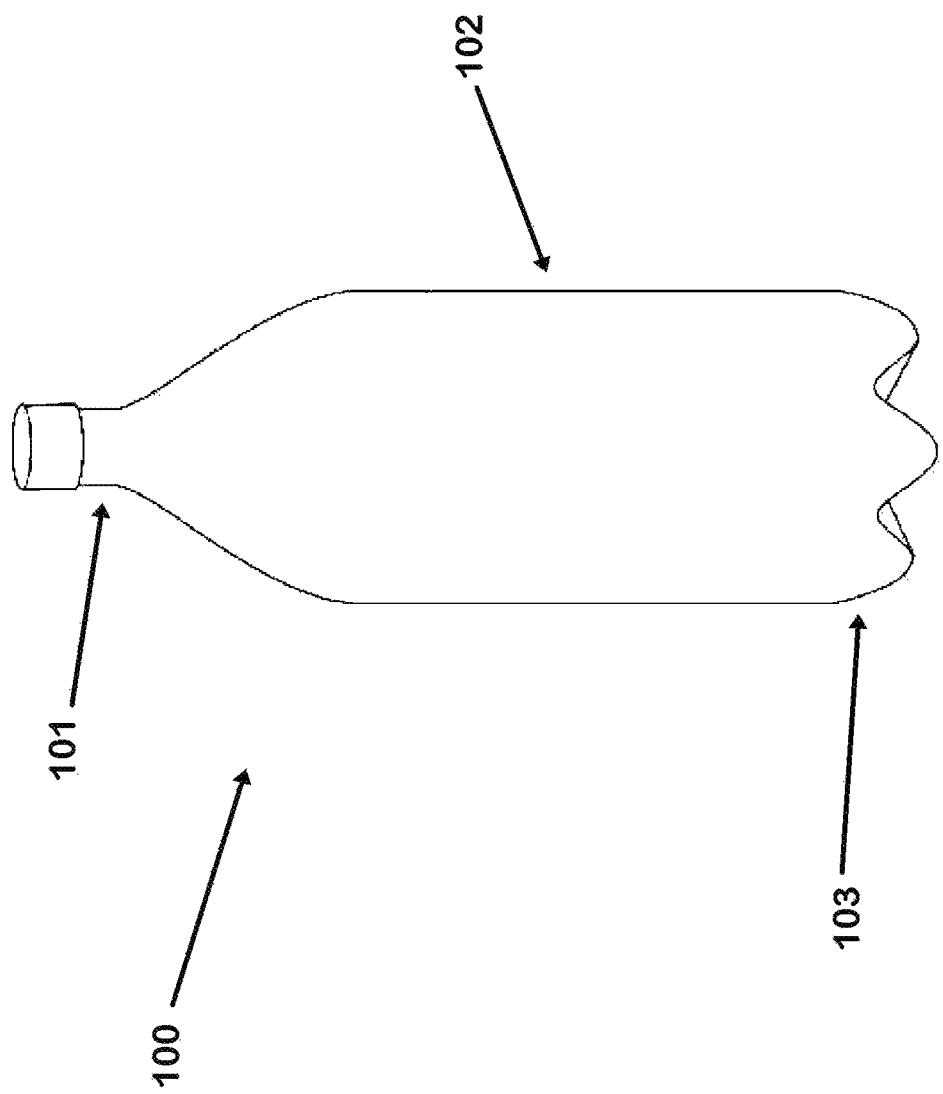

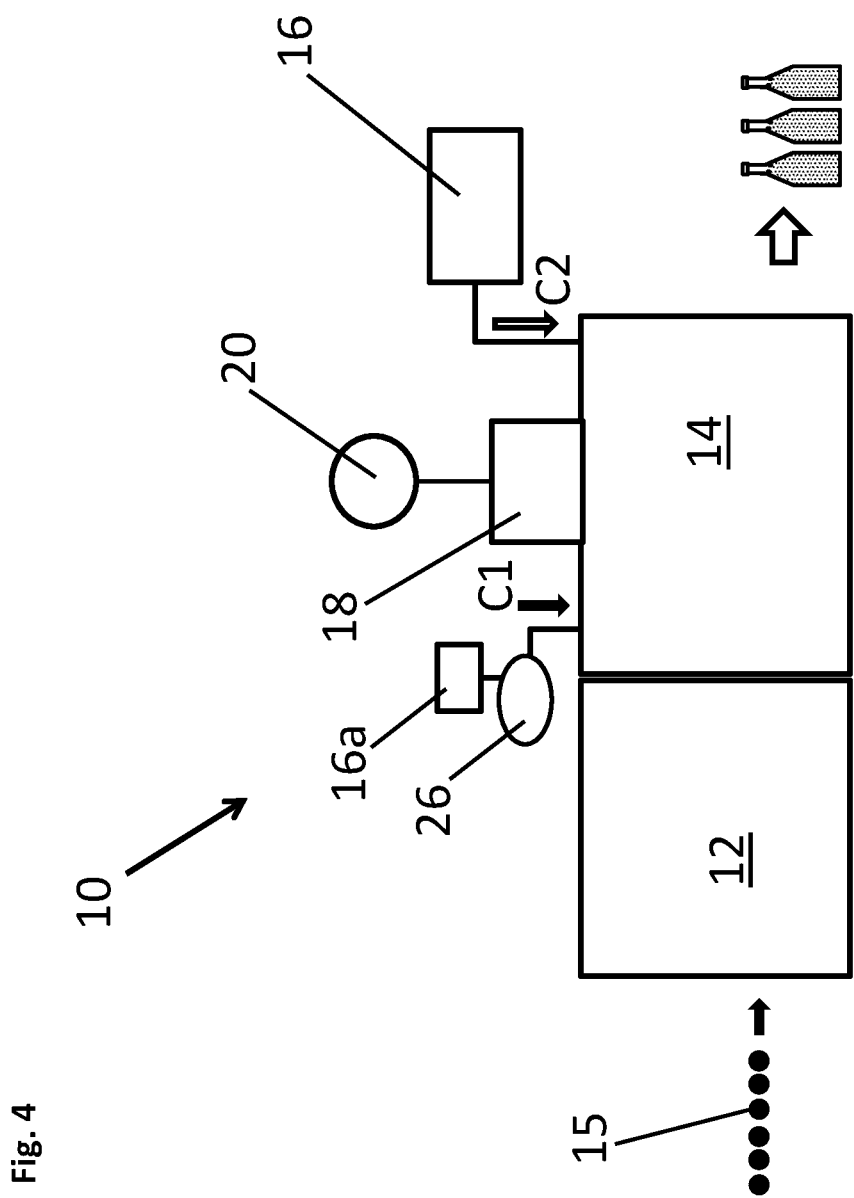

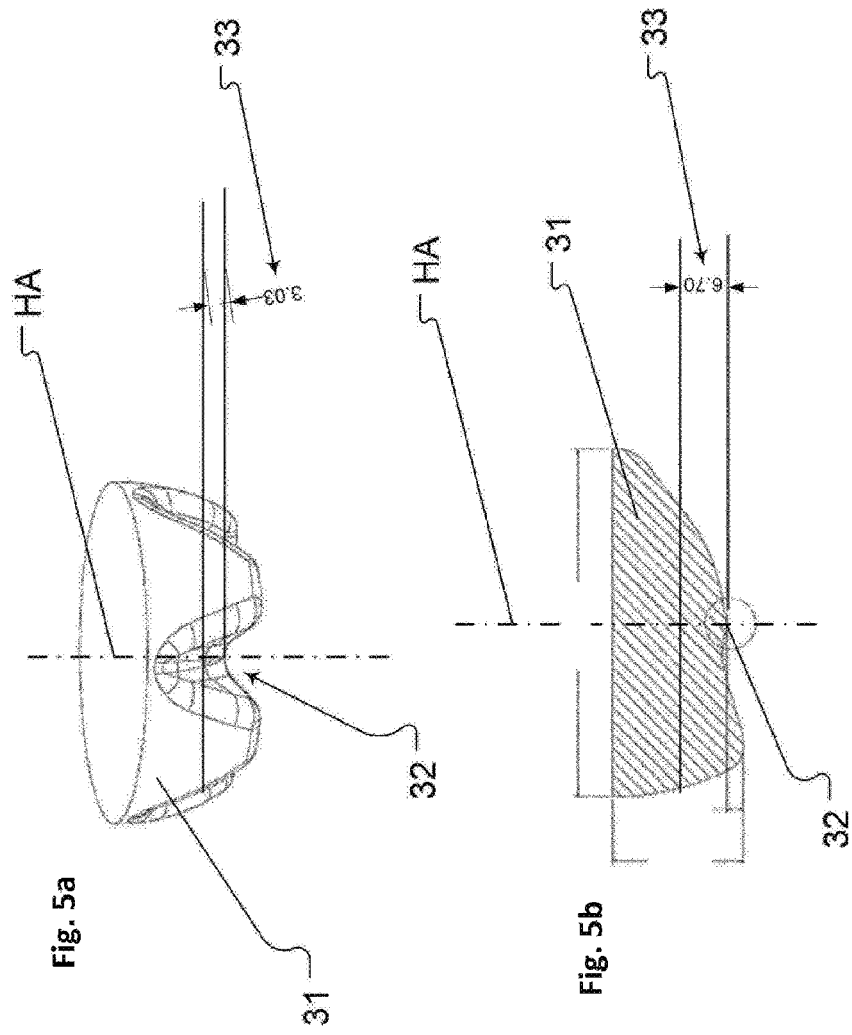

BEVERAGE BOTTLE FILLING MACHINE AND A METHOD OF FILLING BEVERAGE BOTTLES AND SIMILAR CONTAINERS

CROSS-REFERENCE TO RELATED APPLICATIONS

The present application is a Continuation-in-Part of International Patent Application No. PCT/EP2019/063315, filed May 23, 2019, which claims the benefit of Federal Republic of Germany Patent Application No. DE 102018119550.8, filed Aug. 10, 2018, each of which is incorporated by reference herein in its entirety.

BACKGROUND INFORMATION

1. Technical Field

The present application relates to a beverage bottle filling machine and a method of filling beverage bottles and similar containers.

Beverage bottle filling machines, or simply filling machines, are used in the beverage bottle filling or bottling industry to fill bottles with a liquid beverage. Such machines can be of a rotary or linear design. Rotary beverage bottle filling machines include a rotary carousel or rotor or similar structure that has a plurality of individual beverage bottle filling devices or beverage bottle filling stations mounted or positioned on the perimeter or periphery thereof. In operation, an individual beverage bottle is received or picked up from a bottle or container handling device or machine, such as another bottle treatment machine or a container transport or conveyor, which can be either of a rotary or linear design, and held at a corresponding individual filling device or station. While the rotary carousel rotates, each individual filling device or filling station dispenses a beverage, such as soft drinks and sodas, wine, beer, fruit juices, water, or other beverages, or another liquid product. Each individual filling device is usually designed to fill one beverage bottle or similar container at a time. Upon completion of filling, the beverage bottle or container is released or transferred to yet another bottle or container handling device or machine, such as another bottle treatment machine or transport device. The filling devices are therefore designed to fully dispense a predetermined or desired amount or volume of product into the beverage bottles or containers before the beverage bottles or containers reach the exit or transfer position out from the filling machine. The beverage bottle filling machine can also be of a linear design, wherein beverage bottles are moved to one or more filling positions along a straight or linear path.

Such filling machines are usually part of a filling or bottling plant, wherein the filling machine operates in conjunction with a number of other beverage bottle or container handling machines, such as a closing machine for placing caps or closures on filled containers, a container manufacturing machine for making or forming containers to be filled, and a container packaging machine for packaging individual containers for shipment and sale to consumers. Such plants are designed to operate as quickly and continuously as possible, and any interruptions in operation result in a loss of productivity and an increase in operating costs, especially since such plants can process large numbers of containers, such as, for example, anywhere from sixty to one hundred thousand containers per hour.

2. Background Art

This section is for informational purposes only and does not necessarily admit that any publications discussed or referred to herein, if any, are prior art. The present application relates to the formation or manufacture of beverage bottles and similar containers. One common type of beverage bottle is a plastic beverage bottle or container, such as are usually used to contain soft drinks, juices, water, and other similar consumer drinks, and sometimes alcoholic beverages, such as wine and beer.

The present application further relates to a method for filling containers under pressure with a carbonated liquid product, namely a carbon dioxide-containing liquid product, which comprises a given product carbon dioxide content. The present application also relates to the filling of hot containers, including plastic containers produced by stretch-blow molding, such as plastic containers with the external configuration of conventional beverage cans, PET bottles, or kegs with the carbonated carbon dioxide-containing liquid product, relating in particular to a carbon dioxide-containing beverage, such as different types of what are referred to as soft drinks, but which can also be beer or wine.

Carbonated liquid products, namely liquid products containing carbon dioxide, with a given product carbon dioxide content, are often filled via a filling process in which a specific filling pressure is set during the filling process. The filling pressure can be in the range of four to seven bar, or approximately four to seven bar, depending on the type of liquid product. usually a beverage, the carbon dioxide content of the liquid product, and/or the temperature of the liquid product which is to be filled. With such a pressure filling, the containers are prestressed before or at the beginning of the filling process with an inert gas or prestressing gas or gas mixture, such as, for example, carbon dioxide, to a pressure above the saturation pressure of the liquid which is to be filled, or to the filling pressure, which is to be maintained during the subsequent filling of the containers, in order to prevent or minimize the degassing of the carbon dioxide contained in the liquid or to prevent or minimize the foaming of the liquid. Hereinafter, the expression carbonated liquid product is to be understood to mean also other products, which, in an analogous manner, are put under pressure with a gas or gas mixture, such as, for example, stout beers, to which nitrogen is added in an analogous manner.

The prestressing of the interior of the container with inert gas can prove problematic, in particular, for example, if the containers are still warm or hot coming from an upstream container handling procedure, and then run into the filling machine in the warm or hot state. For example, PET bottles are produced by stretch-blow molding in a stretch-blow process and then transferred to the filling machine. If, for spatial reasons or due to economies of time, energy, and costs, it is intended that no cooling segment should be included, or is excluded, between the stretch-blow molding machine and the filling machine, there is a risk of possible undesirable deformation of the stretch-blow molded PET bottles, since the plastic material is still very soft due to the high temperature involved.

It is to be emphasized here that a deformation of the container, in particular of its base region, is very disadvantageous. In particular for automated transport and the further handling of the container in filling systems, grouping systems, labeling systems, and packing systems, a geometric configuration of the container which deviates from the reference or standard configuration is very obstructive. It is particularly problematic if the base region of the container is undesirably deformed.

In order to counter the disadvantages of necessary cooling segments in a production and filling system, which on the one hand require space inside the production and filling system, and, on the other, incur extensive costs and use of energy, some methods and associated devices may perform a pressure filling with carbon dioxide-containing beverages directly after the blow-molding can be achieved. In some methods, at the beginning of the filling, a low first pressure, preferably ambient pressure, is introduced in the containers, and only with increasing filling volume, and therefore inherent container cooling, is the pressure increased to the desired reference pressure. It is difficult, however, for the carbon dioxide content, or $CO_2$ content, prescribed according to the product specifications, of the finished filled beverage to be adjusted precisely, such that the filled beverage fulfils the product specifications in the proper manner and exactly, and such that unacceptable fluctuations in this respect can be avoided between individual containers.

BRIEF SUMMARY

At least one possible object of at least one possible exemplary embodiment of the present application is therefore to provide a method which allows for a simple filling of containers with carbon dioxide-containing beverages with low spatial requirements and low costs expenditure, regardless of the container temperature, wherein, with the method, in the course of the filling, the carbon dioxide content in particular can be precisely adjusted for the finished filled liquid product, in accordance with the given product specifications and with the minimum possible fluctuations.

This object can be achieved by performing a method according to at least one possible exemplary embodiment disclosed herein, and by a device according to at least one possible exemplary embodiment disclosed herein.

The present application describes, in part, a method for the filling of containers with a carbon dioxide-containing liquid product having a given product carbon dioxide content. In the method, the containers are transferred to a filling machine with filling elements, and then are filled by the filling elements. During the beginning of the filling, in a first filling phase, each container is put under a first pressure, which may be ambient pressure or another pressure, and the pressure in the container is subsequently increased in a second filling phase to at least one second pressure. In this situation, quite generally, in the first filling phase a volume of a first product component with a first carbon dioxide content is supplied to the filling element and filled into the container by way of the filling element. In the second filling phase, a volume of a second product component, with the same or a second carbon dioxide content, is supplied to the filling element, and filled into the container by way of the filling element. In this situation, at least one of the two carbon dioxide contents of the two product components is higher than the given product carbon dioxide content of the liquid product, such that, finally, the first filling phase and the second filling phase are matched to one another in such a way that the liquid product in the completely filled container exhibits the specified reference value of the product carbon dioxide content.

According to at least one possible embodiment variant of the method, in the first filling phase, a volume of a first product component with a first carbon dioxide content is supplied to the filling element, and is filled by way of the filling element into the container, and that, in the second filling phase, a volume of a second product component with a second carbon dioxide content is supplied to the filling element, and is filled by way of the filling element into the container. In this situation, at least the second carbon dioxide content of the second product component, due to the mixing with the first product component, is reduced or diluted, so to speak, such as to the specified, desired, or predetermined product carbon dioxide content for the liquid product.

In this situation, according to one exemplary embodiment, both filling phases, namely both the first filling phase, which takes place at the first pressure prevailing in the container, as well as the second filling phase, which takes place at the increased second pressure which is set in the container, are carried out in the same filling machine. In this situation, at the transfer to the filling machine, each container which is to be filled is assigned to a corresponding filling element of the filling machine, at which both filling phases are then carried out, i.e., the filling in both filling phases takes place by way of one and the same assigned filling element of the same filling machine.

As a result of this, both the production time as well as costs and space are saved since all of the filling phases, up to the complete filling of a container, can be carried out by way of the one filling element which is assigned in each case to the filling machine provided. Transport procedures and other additional container transfers between pre-filling and/or metering devices, which may possibly be of different types, and the "actual" filling machine can therefore advantageously be done away with, as a result of which transport segments can be reduced to a minimum. Likewise, the extent and expense of the control system can advantageously be kept low, since in this way the situation can be avoided in which a control device provided for the control system must necessarily communicate with additional filling devices different from the "actual" filling machine, such as pre-filling and/or metering devices.

The container coming from an upstream container handling unit or container handling station can be transferred directly to a filling position of the filling machine, equipped with a filling element, and then immediately filled in the first filling phase with the first liquid component. In this situation, account does not need to be taken of what temperature the container exhibits, namely, in particular, the container wall or the container base. Due to the first filling phase taking place initially with a low first pressure prevailing in the container, the mechanical loading imposed on the container is kept so low that even the still warm or still hot container wall, and in particular the container base, resists the stresses. The cooling effect incurred by the first liquid component essentially leads, during the first filling phase, to an adequate hardening of the container wall, or to a stabilization of the container or of the container shape, form, contour, or design, such that the container subsequently also resists the second pressure which is to be set or has been set in the second filling phase.

In the meaning of the present application, in this situation the "direct" transfer of the container from the upstream container handling station to the filling machine, for example, from a stretch-blow machine to the filling machine, is to be understood as such that no further handling unit or treatment unit is arranged between the stretch-blow machine and the filling machine. Only removal devices or transfer devices, such as, for example, a removal star, for removing the containers from the stretch-blow machine are, in this situation, arranged between the stretch-blow machine and the filling machine. Depending on the location circumstances and the configuration of a production system, a short transport segment can also be provided, on which, with normal line capacity, the container base may possibly only cool a little, however, and specifically to a degree which is not of significance for the hardness or stability of the container.

In at least one possible exemplary embodiment of the method, account likewise does not have to be taken of what temperature, incurred or caused by the still hot container wall, subsequently prevails in the interior of the container, since the carbon dioxide loss, or the dispersal of carbon dioxide from the first liquid component, namely the degassing of the first liquid component, can be disregarded. Due to the matching of the first and second filling phase, and in particular due to the matching of the proportions of the respective volumes of the first and second liquid components and the simultaneous corresponding adjustment of the first or second product component to a value which is higher than that of the given product carbon dioxide content of the liquid product, it is possible for the given product carbon dioxide content to be attained in the end product. For example, with the corresponding adjustment of the second carbon dioxide content of the second product to a higher value, the entire escape of the carbon dioxide present from the first liquid component can also be compensated for. In other words, carbon dioxide is lost during degassing of the first liquid product component dispensed in the first filling step. In order to achieve a desired carbon dioxide amount or level in the final liquid product, the second liquid product component dispensed in the second filling step has an increased amount or excess carbon dioxide above the desired carbon dioxide amount in order to compensate for the carbon dioxide lost from the first liquid product component.

It is therefore unnecessary to take steps in order to counteract a degassing of the first liquid component during the first filling phase. The first filling phase, namely the filling of the first liquid component, can therefore also take place, for example, by way of free-jet filling or open-jet filling or contactless filling or pressureless filling, wherein the filling can take place in particular at high filling speed. In addition, since there is no need to prevent degassing, measures can also be done without for preventing foam formation or foaming during the first filling phase.

Since the carbon dioxide can escape unhindered in the first filling phase without impairing the specification values relating to the carbon dioxide content of the finished filled beverage, namely the given product carbon dioxide content of the liquid product, the first filling phase can, for example, also be carried out before, or without, the containers being brought into a sealing contact position with a respective filling element. In such a sealing contact position, a dispensing opening of the filling element is connected to the container opening in a gas-tight or sealed manner, for example, by way of a sleeve or a centering bell. A gas-tight connection of this type can preferably be done without during the first filling phase, such that the first filling phase can be carried out as contactless filling.

It is of course also possible, as an alternative, for a contact filling to be carried out in the first filling phase, although at a first pressure that is low. The regulation or controlling of the imposition of pressure can in this situation, if appropriate, be controlled in such a way that, with the filling of the first product component and the cooling inherent with this of the container wall, at the same time a slow pressure rise is already put into effect, such that, at the end of the first filling phase, a higher pressure has already been set in the container than at the beginning of the first filling phase. Depending on the filling process and the given process conditions in this situation, it is also conceivable that, for example, with the end of the first filling phase, the second pressure, intended for the second filling phase, will already be reached. This in turn can promote or produce a time-optimized filling.

The present method is therefore, in at least one exemplary embodiment, a method for filling containers with carbonated liquid under pressure. In this situation, the containers which are to be filled can be filled directly after the stretch-blowing, without intermediate steps, in one and the same filling machine, and specifically under pressure.

According to a further exemplary embodiment, the first product component can be filled with a first relative density, measured in degrees Brix, and the second product component can be filled with a second relative density, measured in degrees Brix. This density stands here in representation of the concentration or the dilution factor respectively of the beverage, wherein other parameters than the sugar content can likewise be implied or understood by analogy.

In this situation, the first relative density of the first product component is less than a given product value of the relative density of the liquid product, and the second relative density of the second product component is higher than the given product value of the relative density of the liquid product. The first and second relative densities are set as a dependency of the respective volumes of the first and second product components which are filled in the first and second filling phases, and specifically in such a way that the liquid product in the completely filled container exhibits the given product value of the relative density.

The relative density, measured in degrees Brix, which in this situation is also to be understood as the specific density in degrees Brix or as the Brix content or Brix value, is used especially with beverages containing sugar, such as with fruit juices, lemonades, or similar, in order to determine the approximate sugar content of the beverages, wherein high Brix values indicate a sweeter taste. For example, a liquid has a degree Brix (1% Brix) if it has the same density as a solution of 1 g of saccharose or sucrose in 100 g of a saccharose/water solution.

In at least one exemplary embodiment, the two liquid phases of the method are matched to one another in such a way that the finished filled liquid product simultaneously fulfils both the desired given carbon dioxide content and the desired given Brix value, as well as the corresponding product specifications.

In at least one exemplary embodiment, the first product component can be a product component that exhibits a first carbon dioxide content that is lower than the given product carbon dioxide content of the liquid product. The first product component can be a non-carbonated liquid product component, such as water. When the first product component is water, the water used must be product water, i.e., water that is suitable for the liquid product, such as, for example, pure clean water or water of sufficient purity to be used in foodstuffs or as drinking water. The product water can be delivered to the filling elements from a product water supply for the first filling phase, and then accordingly be filled into the containers. The volume of product water can be essentially regarded as a simple "diluting agent," wherein the carbon dioxide content and Brix value are adjusted and set in accordance with the corresponding product specifications by way of the carbon dioxide content and the relative density of the second product component, which is mixed with correspondingly increased carbon dioxide content and Brix value, and conveyed to the filling element.

In this situation it is sufficient for the volume filled in the first filling phase of the product water used as the first product component to be monitored and adjusted. To match up to the first product component, the volume of the second product component, as well as the second carbon dioxide content and the second relative density of the second product component, can be adjusted in such a way that the liquid product in the completely filled container exhibits the given or desired product carbon dioxide content and the desired Brix value.

According to one exemplary embodiment variant, during the first filling phase the first pressure corresponds to the ambient pressure, that is, the pressure in the surrounding environment, such as the area immediately around the filling device or the filling machine, or the filling plant as a whole. In this exemplary embodiment variant, the first filling phase can be carried out as a contactless filling phase without the container being in a sealing position at the filling element or in sealing contact with the filling element.

For the second filling phase, the pressure in the container is raised to the second pressure. This second filling phase can be understood as being what is referred to as pressure filling, which, in the context of container filling described herein, is a filling method in which the respective container which is to be filled is moved into sealing contact against the filling element. In addition, before or during the actual filling phase, i.e., before or at the opening of a liquid valve of the filling element, by way of at least one controlled gas path formed in the filling element, the respective container is subjected to prestressing with a prestressing gas, such as an inert gas or carbon dioxide gas, which is under pressure. The prestressing gas is then increasingly expelled from the container interior as return gas during the filling of the second product component or filling product flowing into the container, and can then escape from the container in a controlled manner by way of at least one controlled return gas path, likewise formed in the filling element. For soft drinks containing carbon dioxide and other similar carbonated liquid products, the reference pressure with such pressure filling usually can be between 4.5 and 7 bar, depending on the carbon dioxide content, the temperature, and the physical solubility of the carbon dioxide in the drink.

In at least one exemplary embodiment, in the second filling phase, the increase of the pressure to the second pressure, also known as the prestressing of the container, takes place simultaneously or essentially simultaneously with the filling of the second product component into the container. Such a simultaneous or essentially simultaneous prestressing and filling can permit or promote a reduction in overall filling time and the costs related thereto since the time necessary for the complete filling of each container, namely the filling time per container, can be perceptibly reduced.

In principle, the increase from the first pressure to the second pressure can take place in a controlled manner, such as in one or more steps or continuously, i.e. steplessly, wherein there are various different possibilities of controlling the pressure in the container. Conceivable in this situation are, for example, a temperature-dependent control process, with which the pressure rise is controlled as a dependency of a measured container temperature or container wall temperature, in particular at the base. Likewise conceivable is a control arrangement dependent on the filling level, with which the pressure rise is controlled depending on the amount of fluid supplied to the container, and therefore as a dependency of the filling level in the container. As an alternative or in addition, the pressure rise can also take place as time-dependent.

In at least one exemplary embodiment, the method can comprise, for example, at least the following method steps:

transferring the containers to a filling machine,
positioning the container at a filling element of the filling machine at ambient pressure,
first filling phase or partial filling at ambient pressure, in which the product component is conveyed to the filling element and then dispensed into the container by way of the filling element,
second filling phase or complete filling, in which prestressing takes place to the second pressure or reference pressure, and the second product component is conveyed to the filling element and then filled into the container by pressure filling or rapid filling,
optional: slow filling towards the end of the second filling phase,
calming phase,
stress relief,
release of the container from the filling element, and
transferring the container from the filling machine for further transport, such as by use of a transport star.

In the event of the procedure for the pressure increase impeding the filling, the pressure increase and the filling can also be carried out alternately, such that, during the pressure increase, the filling is briefly interrupted. This embodiment differs from the filling procedure that is carried out continuously from beginning to end without interruption, which can provide a more rapid and more turbulence-free filling of the container. If the procedure for the pressure increase impedes the filling, then it is also possible for pressure relief to be carried out during the filling.

In at least one exemplary embodiment, the reference pressure in the container for filling the second product component containing carbon dioxide is regulated in a range of four to eight bar, or possibly in a range of five to seven bar, or approximately in those ranges, or in those ranges plus or minus one or two bar. This is possible inasmuch as a corresponding pressurized gas source is connected to the container interior. As the pressurized gas, use is made of carbon dioxide or an inert gas, such as nitrogen, or a gas mixture. The containers coming from the stretch-blowing, and still hot, are transferred immediately or essentially immediately or practically immediately after the stretch-blowing to the filling machine, and in the first filling phase, at the first pressure, are filled with the first product component. The volume of the first product component filled into the still hot container is used for the cooling of the container, primarily the container base, and amounts to a maximum of 30% of a total reference filling quantity.

The hot plastic containers, such as PET containers, coming from the stretch-blowing, are filled with liquid immediately after or subsequent to the stretch-blowing. Due to the fact that in the first filling phase, namely at the beginning of the entire filling process, the first pressure is set in the container, which first pressure corresponds to ambient pressure in at least one exemplary embodiment, and which in any event lies below the second pressure, there is still no pressure, or scarcely any pressure, being exerted on the still hot container due to prestressing. The still hot plastic container is therefore not deformed due to the pressure present in the container. It is only in the second phase, i.e., with a decreasing and already perceptibly lower temperature of the container, that the pressure in the container is raised to the second pressure, which is preferably the reference or target pressure which must be set for the filling of the container with a specific beverage which exhibits a particular carbon dioxide content.

In other words, according to one exemplary embodiment, the first pressure inside the container is equivalent to or very close to the prevailing pressure outside the container. Since the inside and outside pressures are equivalent or similar or very close to one another, the stresses exerted, if any, on the heated or hot container body, specifically the container walls and container base, are insufficient to cause deformation or substantial deformation of the container body. To further explain, since the container body, at the time of the setting of the first pressure inside the container body, is still heated or hot from the stretch-blowing process, the container body is susceptible to deformation out of the desired or predetermined shape and/or dimensions. Application of a pressure force to the heated or hot container body could result in deformation, thereby resulting in at least damage to the appearance of the container, and at worst substantial structural damage that renders the container unsuitable for use as a container. Deformation of the container base can be especially problematic as the container base not only supports the container in an upright position, but also can be used to interface or interlock with a corresponding transport structure, such as a box or tray or similar packaging. Deformed container bases will cause the containers to fall over, which can cause significant interruptions in container processing and shipping. By maintaining, at least initially when the container is at its highest temperature and thus most susceptible to deformation, a pressure inside the container that is equivalent or similar or close to the pressure outside the container, unwanted deformations can be avoided or at least minimized to a degree within manufacturing tolerances.

Due to the incoming first product component, the sensitive base region of the container is cooled, with the result that it is no longer at risk of being deformed even when a greater internal temperature is subsequently imposed. Accordingly, when the first product component to be filled covers and/or has cooled the base region and/or at least parts of the wall of the container to such an extent that these will no longer be deformed in an impermissible manner when pressure is imposed, the container can then be put under the second pressure, namely the reference or target pressure which leads to the second liquid component, containing carbon dioxide, not degassing when being filled during the second filling phase.

Due to the multi-phase filling procedure, comprising the first filling phase at a lower first pressure and the second filling phase at a higher second pressure, such as the reference or target pressure, it is ensured that, on the one hand, the container is not deformed if it is filled immediately after the stretch-blowing, and, on the other, reliable and secure filling is possible even with liquid products with a high carbon dioxide content, such as carbonated beverages.

Due to the fact that, with the method, an immediate filling of the still hot container is possible, the cooling segment can therefore be done way with between the stretch-blowing machine and the filling machine, which leads both to the saving of space in the building as well as to economies in energy and/or cooling components. The costs of production and filling can therefore be perceptibly reduced without the handling of the just recently stretch-blown container being at risk of deformation during the filling procedure which immediately follows. The filling which immediately follows the stretch-blowing therefore takes place at least largely free of deformation. The risk is also substantially reduced of contamination of the containers, which at this time are still open, during their transport from the blowing machine to the filling machine, since the transport path is substantially shortened due to the elimination of the cooling segment, and any external imposition of water is at least partially avoided.

According to an exemplary embodiment variant, the volume of the first product component filled into the container in the first filling phase, under the first pressure, amounts to 0.7% to 25% of the total reference or target quantity, or possibly 1% to 12.5% of the total reference or target quantity, or possibly 2% to 5% of the total reference or target quantity. In at least one exemplary embodiment, the volume of the first product component can amount to around 20% or around 15% or around 10% or around 7.5% or around 3% or around 1.5% of the total reference or target quantity. With containers with a content volume of about one liter, such as one-liter bottles, with which provision is made for a reference or target quantity of one liter, the volume of the first product component is therefore possibly set in a range, in milliliters (ml), from 7 ml to 250 ml, or from 10 ml to 125 ml, or from 20 ml to 50 ml. According to at least one exemplary embodiment, for a one-liter bottle, the volume of the first product component amounts to around 200 ml or around 150 ml or around 100 ml or around 75 ml or around 30 ml or around 15 ml of the total reference or target quantity.

With containers with a reference quantity of 0.5 liter or 1 liter or 1.5 liter, such as with 0.5 liter beverage bottles, 1 liter beverage bottles, or 1.5 liter beverage bottles, the base region can be covered by a volume of 15 ml or 10 ml. In the case of containers coming hot directly from the stretch-blowing machine, this volume of 15 ml or 10 ml is sufficient to cool the base region by the required amount, in such a way that deformation of the container or the base region is avoided. Since the cooling process and the cooling time required are largely dependant on the thermal conductivity of the container material and the heat absorption and thermal capacity of the first liquid component, it is possible, with a known thickness of the container material, on the one hand for the optimum volume of the first liquid component and/or the duration of the cooling period to be determined, such that the processes of pressure increase and filling for the second phase can also be controlled, for example, by a time control procedure. In other words, the volume of the first product component can be selected to be sufficient to cool the container base such that the container base solidifies and is no longer susceptible to deformation by the pressure forces exerted during pressurized filling. The volume can be selected based on a variety of factors described herein, including, but not limited to, the container thickness, the heat absorption, the size of the container, the processing time, and the type of liquid product component.

The wall region of the container with the greatest thickness, and therefore also with the greatest proportion of stored heat, is the container center, i.e., the region of the feed point or injection point or seam, and the surface adjacent to this. As a rule, it is here that the non-stretched or less stretched region of the bottle base is arranged. This region is passed through centrally by the vertical axis of the container. It has been found that a coverage height of the inner container surface above the feed point or injection point with the first product component of at least 1.5 mm produces a desired cooling of the container base. The coverage height of the inner container surface could also be equal to or greater than 5 mm. Depending on the product, a maximum quantity is attained at some point at which the gas loss from the first filling step can no longer be economically compensated for in the following filling step with a second product component. Up to this maximum filling quantity, pre-filling with a first product component is still practical, such that the degree of coverage can also lie in the range of up to 15 mm.

To further explain, for containers, such as plastic beverage bottles, made according to a stretch blow molding process, a preform is first made, usually via an injection molding process. When the preform is made, the container mouth is completely formed but the body of the container or bottle is not formed, but rather has a cylindrical form about the same diameter as the container mouth. The end of the preform is generally rounded and has an injection point at the center thereof, which is usually the point at which plastic material is injected into the preform mold. The preform is then expanded via blow molding in a container-shaped mold. Because of the stretching of the preform, the thickness or amount of material at the container walls, which are the result of stretching, is generally less than at the container base, which is not stretched much, if at all. The injection point generally has the greatest amount of material or greatest thickness in comparison to other parts of the container. As a result, a greater amount of heat is stored or remains longer at the injection point than at other portions of the container. So, for example, the thinner walls of the container cool or lose heat faster than the thicker injection point. Therefore, the volume of the first product component should be selected such that once the first product component is dispensed into the container, the first product component covers over the injection point. In this manner, the portion of the container with the greatest heat, that is, the injection point, will be cooled to a desired degree. Depending on the amount of heat to be cooled or dissipated, the volume can be selected such that the fill level is at least 1.5 mm above the injection point, or at least 5 mm, or at least 10 mm, or at most 15 mm, or anywhere in the range of at least 1.5 mm to 15 mm.

In at least one possible exemplary embodiment, the first product component is cooled before and/or at the delivery to the filling element, as a result of which the cooling effect on the still hot containers is also increased, and the containers can accordingly be cooled with a lesser volume of the first product component, or in a shorter time, to the desired temperature below the deformability point.

According to one exemplary embodiment variant, the first product component is conveyed to the filling element through a bypass line. For example, the delivery of the first product component can be controlled by a control arrangement, for which use can be made, for example, of control valves.

The method described has been described heretofore in connection with the direct use of plastic containers which are still hot, produced by stretch-blowing. It is conceivable, however, for the method also to be carried out in principle with other types of containers, including glass bottles, in particular if it is intended that such containers are to be filled when hot or warm, coming immediately from an upstream container handling device.

At least one of the embodiments likewise relates to a device for the filling of containers with a liquid product containing carbon dioxide, with a given product carbon dioxide content, for performing the method according to at least one possible embodiment disclosed herein. According to at least one exemplary embodiment, the device comprises a filling machine with filling elements for the filling of the containers. The filling machine is configured such as to fill each of the containers by way of a first filling phase and a second filling phase following this, wherein the filling machine is further configured so as to put the containers under a first pressure for the first filling phase, and, under the first pressure, to fill them with a volume of a first product component with a first carbon dioxide content, and then to set the containers under a second pressure for the second filling phase, and, under the second pressure, to fill a volume of a second product component with a second carbon dioxide content.

In this situation, the filling machine comprises at least one storage container for the first product component, and at least one product container for the second product component, wherein each filling element is connected by a delivery arrangement, controlled by a control device, for delivering the first and second product components. For this purpose, the device comprises a source of gas under pressure, which is in corresponding connection with the filling elements of the filling machine, as well as a pressure control device connected to the gas source, for the corresponding setting and controlling of the first and/or second pressure. The filling elements of the filling machine are configured with suitable gas paths and return gas paths, as well as, if appropriate, with one or more corresponding control valves, and further comprise in each case a filling valve and a valve control device connected to it.

As has already been mentioned heretofore in connection with the method, one possible variant includes raising the pressure in the first filling phase at least over a period of time, in that, for example, in the first filling phase an increase in the pressure to a second pressure takes place by sealing the container against the surrounding environment and thus against the ambient pressure and then delivering liquid and/or introducing an inert gas under pressure, i.e., prestressing. In this situation, the introduction of the first product component can be started with the container not being sealed, and end with it being finally sealed at the mouth during the first filling phase.

In at least one exemplary embodiment, this pressure increase up to the second pressure can take place in the first filling phase, such as to a complete prestressing of the container, wherein this takes place, at least at times, simultaneously with the filling of the first product component into the respective container.

In accordance with at least one exemplary embodiment, the device additionally comprises a stretch-blowing machine for producing containers formed by stretch blowing, wherein the filling machine is arranged immediately next to or close to the stretch-blowing machine, and wherein the filling machine is designed such as to take over or receive the containers coming from the stretch-blowing machine.

The device also can comprise at least one cooling arrangement or structure for cooling the first product component.

Likewise, the device can also comprise at least one bypass line for delivering the first product component to the filling elements.

In accordance with at least one exemplary embodiment, the filling machine is configured as a circulating driven or rotary filling machine with a rotor, wherein an annular reservoir is provided at the rotor of the filling machine for the provision and delivery of the second product component, and wherein an additional annular channel is also provided for the provision and delivery of the first product component.

BRIEF DESCRIPTION OF THE DRAWINGS

FIG. 1a shows an example of a beverage bottle;

FIG. 4 shows a general schematic representation of at least one exemplary embodiment variant of the device shown in FIG. 2;

FIG. 5a shows a beverage bottle base in a perspective view; and

FIG. 5b shows a cross-sectional view of the beverage bottle base of FIG. 5a.

DETAILED DESCRIPTION

Figure 1:
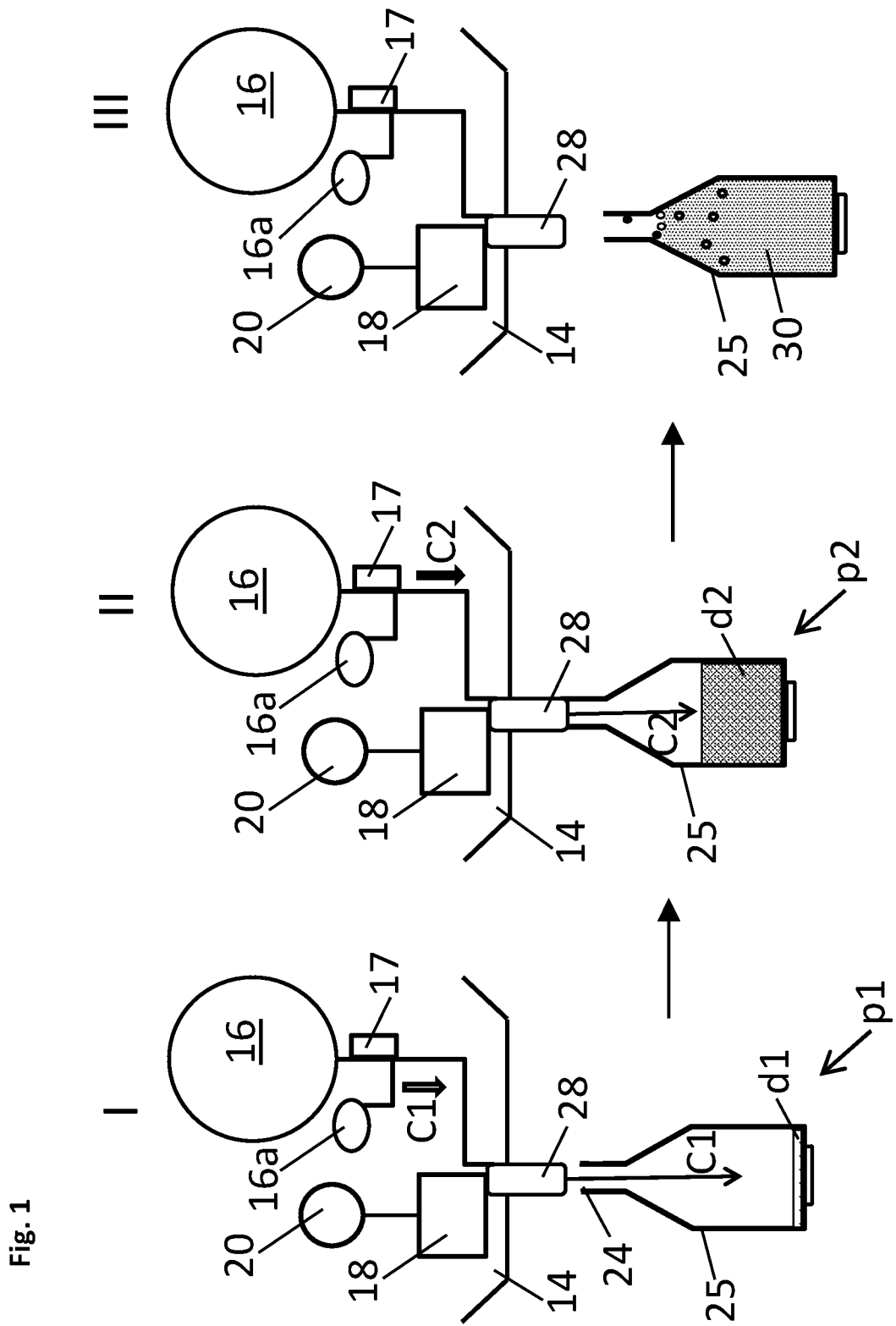
FIG. 1 shows a general schematic representation of steps in a method for filling beverage bottles and similar containers according to at least one exemplary embodiment variant of the present application.

FIG. 1a shows an example of a beverage bottle 100 for containing liquid beverages, such as soda, juice, water, and similar beverages, as well as beer and wine. The beverage bottle has a neck portion 101, a barrel or side wall portion 102, and a base portion 103. The base portion 103 is contoured to form a support structure that permits the beverage bottle 100 to stand upright on the base portion 103 without tipping over. Such beverage bottles 100 are commonly made of plastic, wherein the base portion 103 and the neck portion 101 have a greater thickness of material than the side wall portion 102.

FIG. 1 shows a rough schematic sketch of a method for filling containers 25 with a liquid product 30 containing carbon dioxide, according to an exemplary embodiment variant of the method. The liquid product 30 exhibits a given product carbon dioxide content, which is specified for the corresponding liquid product 30, such as a beverage containing carbon dioxide or carbonated in accordance with the product specifications.

With the method, each container 25 is transferred to a filling machine 14, as shown in FIG. 1 only as a section and by way of indication, wherein the filling machine 14 comprises a plurality of filling positions, each of which is equipped with at least one filling element 28 in each case, and wherein each container 25 is filled by a corresponding one of the filling elements 28. For this purpose, each container 25 is first positioned at a corresponding filling position of the filling machine 14 in such a way that the filling element 28 can interact with the container 25 in order to dispense, in a first filling phase, a first product component C1 to the container 25. In FIG. 1, the first filling phase is assigned the Roman numeral I.

In the first filling phase I in FIG. 1, which in the present case can also be understood as the first filling step, the container 25 is set under a first pressure p1, which in the example represented corresponds to the ambient pressure and therefore lies at about 1 bar. It should be noted that "ambient pressure" refers to the surrounding environmental pressure, which could be 1 bar, or approximately 1 bar, or in a range of 0.5 bar to 1.5 bar, including tenths of a bar in that range, or possibly higher or lower, depending on the surrounding environment. The first filling phase can therefore also be understood in the example in FIG. 1 as a pressureless filling phase or pressureless filling, wherein, during this first filling phase, no pressure imposition takes place on the container 25 and no gas delivery takes place into the container interior. During the first filling phase, the first product component C1 is delivered to the filling element 28 by way of a corresponding delivery arrangement, wherein, for example, the first product component C1 is conveyed coming from a storage container 16a through a delivery line, which forms a delivery arrangement, to the filling element 28. The delivery of the first product component C1, which is indicated in FIG. 1 by an arrow extending into the container 25, is in this situation controlled by a control device 17, wherein, for example, suitable control valves are used.

The dispensing of the liquid product components C1, C2 from the filling element 28 into the container 25 finally takes place by way of a corresponding dispensing opening of the filling element 28, and specifically in a known manner, controlled by a respective controllable valve unit, such as a controllable liquid valve, which comprises a valve cone which can be moved in a controlled manner relative to a valve seat.

The volume of the first product component C1 delivered to the filling element 28 is dispensed or filled into the container 25 during the first filling phase by way of the filling element, as indicated in turn by an arrow in first filling phase I of FIG. 1. In the example shown, for the first filling phase, the container 25 is not brought into a sealing position with the filling element 28, that is, a container opening or mouth portion 24 is not moved into contact or sealing engagement with a dispensing opening of the filling element 28. Consequently, air can escape as it is dispelled from the interior of the container by the volume of the first product component C1 being filled or already filled. There is accordingly no rise in pressure in the interior of the container 25 due to the volume of the first product component C1 being dispensed into the container 25. The first filling phase I therefore takes place without contact.

Although not explicitly represented in FIG. 1, it is however also possible, as an alternative, for the sealing position to be already established between the container opening 24 and a section of the filling element 28 during the first filling phase, and for the pressure in the container 25 to be increased slowly. For this purpose, it is possible, for example, for the first filling phase to be started without the container in a sealed position. During the first filling phase, the sealing position can then initially be established, as a result of which the internal pressure in the container 25 rises slightly, in order finally to be increased further for the following or subsequent second filling phase, or during the second filling phase. This therefore saves time, such that the entire filling process runs with optimum or desired timing.

The first product component C1 exhibits a carbon dioxide content, namely a first carbon dioxide content, which is lower than the given product carbon dioxide content, or the desired or predetermined carbon dioxide content, of the finished liquid product 30. Carbon dioxide or $CO_2$ present in the first product component C1 escapes at least partially or entirely from the liquid due to the filling process in the first filling phase, since under the prevailing ambient pressure in the interior of the container the foaming and/or degassing of the first product component C1 is not counteracted. In particular, in such cases in which the containers 25 are coming from a container handling machine upstream of the filling machine 14, in which the containers 25 undergo a treatment under increased or high temperatures, and are transferred when still warm or hot to the filling machine 14, the carbon dioxide which may possibly be present will be partially degassed from the first product component C1, due to the fact that this degassing is dependent on temperature and time. In such cases, the filled volume of the first product component C1 also serves to cool the container 25.

In the example represented in FIG. 1, as the first product component C1 a product component is used which exhibits a first relative density d1, measured in degrees Brix, which is less than a given product value of the relative density of the finished and completely filled liquid product 30.

After the first product component C1 has been filled into the container 25, the second phase, marked in FIG. 1 with the Roman numeral II, is then started and carried out, in which the pressure in the container 25 is raised to a second pressure p2, which corresponds to the reference or target pressure for the filling, namely the filling pressure, and in the present case lies between 4.5 bar and 7 bar, or approximately 4.5 bar to 7 bar, including tenths of a bar. This pressure rise to the second pressure p2 is also understood to be the prestressing of the container 25. In order to raise the pressure to the second pressure p2, in the second phase the container 25 is brought into sealing contact with the filling element 28, wherein specifically the container opening 24 is brought into sealing engagement and connected gas-tight to the dispensing opening of the filling element 28. The pressure rise to the second pressure p2 takes place in a controlled manner by use of a pressure control 18, which is connected to a source of gas under pressure 20. By use of the pressure control 18 in connection with the source of gas under pressure 20, the pressure in the interior of the container can be controlled in a desired manner during the filling. For the imposing of gas under pressure onto the container 25, a corresponding gas path is provided in the filling element 28, which can be controlled by suitable control valves, and can be opened and closed in a controlled manner. Also formed in the filling element 28 is a return gas path, which can be controlled in a manner known from the prior art.

In the second filling phase II, which in the present case can also be understood as the second filling step, a second product component C2 is delivered to the filling element 28 by way of the delivery path connected to the control unit 17. The second product component C2 is, for this purpose, delivered to the filling element 28 coming from a product container or tank 16 or filling product tank, for example an annular reservoir, through the delivery path. The second product component C2 is mixed with a second carbon dioxide content, namely a second carbon dioxide content, and delivered to the filling element 28, whereby the second carbon dioxide content is higher than the given product carbon dioxide content of the finished liquid product 30. The delivery of the second product component C2 is likewise indicated by an arrow in the section II of FIG. 1.

The prestressing of the container 25 and filling with the second product component C2 takes place simultaneously, but, in at least one possible embodiment, can also take place offset in time or in succession to one another. The filling in the second filling phase takes place at least in part as rapid filling, wherein, optionally, a slow filling follows the rapid filling towards the end of the second filling phase. In order to complete or end the filling process, at least one calming phase follows, then pressure relief, and finally the release of the container 25 from the filling element 28.

With the filling of the second product component C2 taking place under filling pressure in the second filling phase, the carbon dioxide present is prevented from degassing from the liquid and escaping from the interior of the container. The first and the second filling phases are matched to one another in such a way that, after filling has ended, as designated in FIG. 1 by the Roman numeral III, the completely filled and finished liquid product 30 exhibits the given product carbon dioxide content. For this purpose, in particular, the volumes of the first and second product components C1, C2 are taken into account and delivered to the filling element 28 in a monitored and controlled manner. To further explain, the finished liquid product 30, that is, the product to be delivered to consumers, should have a carbon dioxide content in accordance with a desired or predetermined carbon dioxide content for that particular liquid product 30. Since the carbon dioxide content of the first product component C1 is less than the desired carbon dioxide content for the finished liquid product 30, the carbon dioxide content of the second product component C2 is higher than the desired carbon dioxide content for the finished liquid product 30 in order to compensate for the lack of carbon dioxide in the first product component C1. The higher carbon dioxide content in the second product component C2 results in the finished liquid product 30 being at the desired carbon dioxide content within production tolerances.

In the example represented in FIG. 1, the second product component C2 that is used is made of a product component which exhibits a second relative density d2, measured in degrees Brix, which is higher than the given product value of the relative density of the finished and completely filled liquid product 30. As a dependency of the filled volumes of the first and second product components C1, C2, the first relative density d1 and the second relative density d2 are adjusted and set in such a way that the finished and completely filled liquid product 30 exhibits the given product value of the relative density, and therefore fulfils the product specifications.

The first product component C1 is a non-carbonating liquid, such as product water, namely drinking water, although other liquids can be used in other possible embodiments. The volume filled in the first filling phase of the first product component C1 can therefore be regarded, both in relation to the carbon dioxide content as well as in relation to the relative density, as a pure "diluting agent," i.e., the second product component C2 is mixed with a correspondingly increased carbon dioxide content and a correspondingly increased Brix value, in such a way that, due to the resulting dilution with the volume proportion of product water present in the first filling phase, the respective given product values of the liquid product 30 are maintained.

At least one possible exemplary embodiment of the device and the method can be used in bottling or container filling applications in which plastic containers are produced by stretch-blowing, wherein the containers come directly from the stretch-blowing machine 12 and are transferred still hot or heated to the filling machine 14. During the first filling phase I, which takes place under a low first pressure p1, such as under ambient pressure in so-called pressureless filling, the container wall and, in particular, the container base of the container 25 are cooled to a temperature below the deformation temperature due to the cooling effect of the filled volume of the first product component C1. It is only in this cooled state that the prestressing of the container 25 begins to the higher second pressure p2 for the pressure filling in the second filling phase. Any pressure-induced undesirable deformation, or at least any substantial deformation or deformation beyond manufacturing tolerances, of the containers caused by the prestressing is therefore prevented or minimized.

Figure 2:
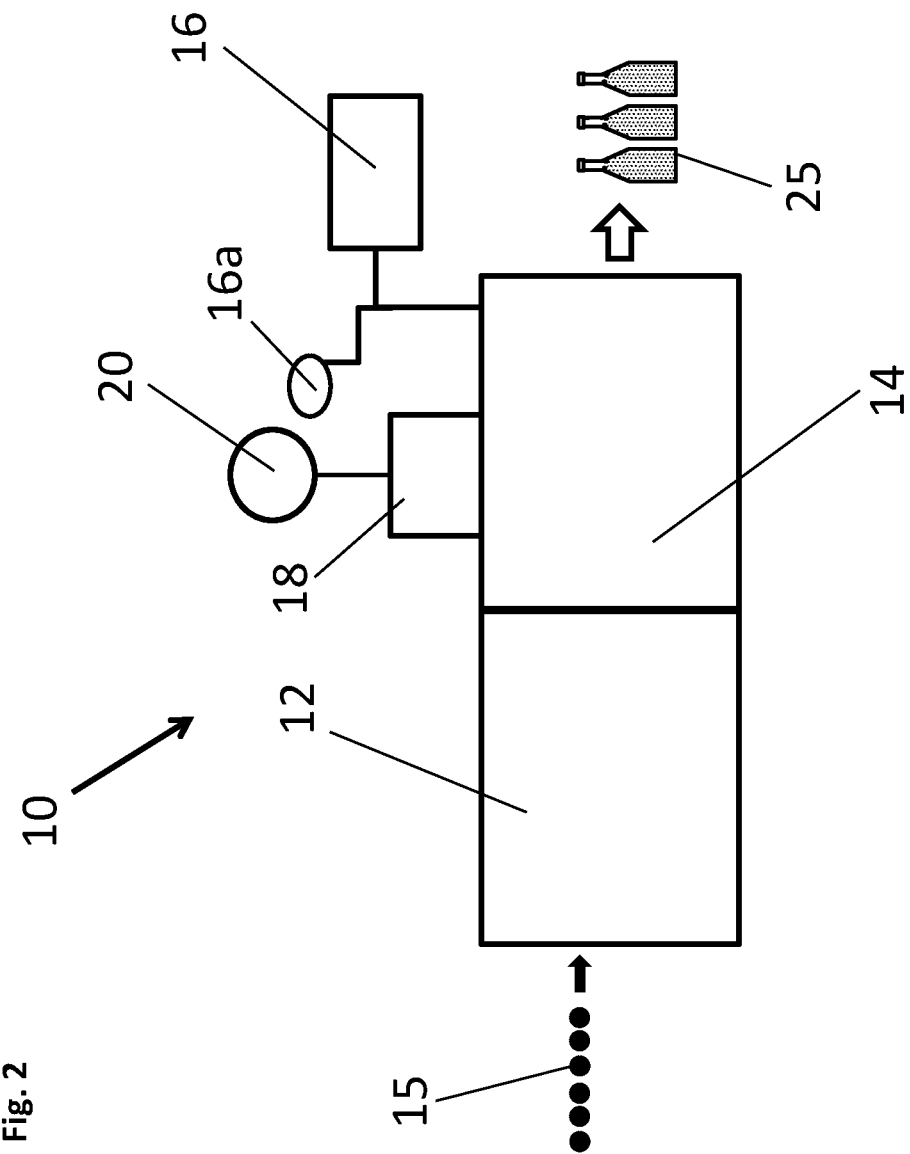
FIG. 2 shows a general schematic representation of a device for the filling of beverage bottles according to at least one exemplary embodiment variant of the present application.
Figure 3:
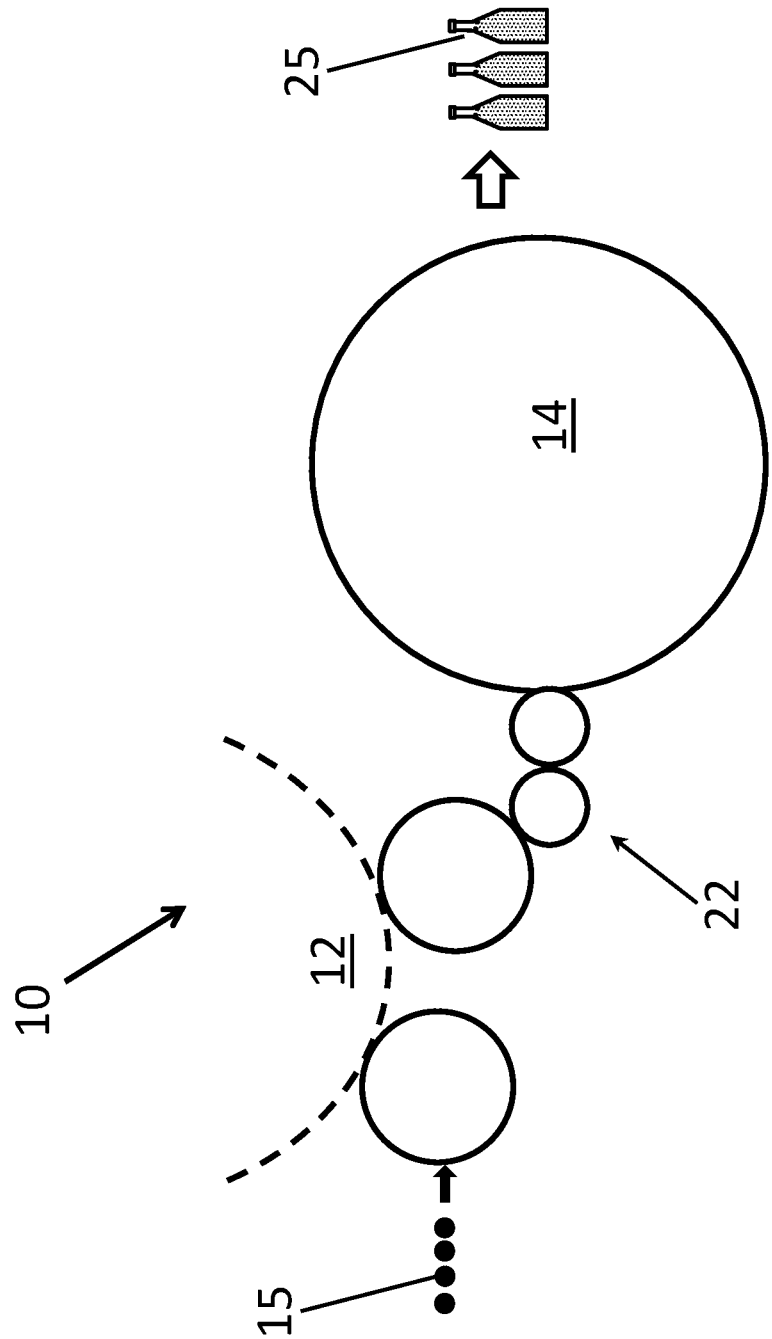
FIG. 3 shows a general schematic representation of a transfer region between a beverage bottle forming machine and a beverage bottle filling machine according to at least one exemplary embodiment variant of the device shown in FIG. 2.

In accordance with at least one exemplary embodiment, the device for the filling of containers 25 comprises a stretch-blowing machine 12 for producing PET bottles, as roughly schematically sketched in FIGS. 2 and 3. The device 10 comprises a stretch-blowing machine 12 and a filling machine 14 arranged immediately downstream of the stretch-blowing machine 12. The two machines 12, 14, can be directly adjacent to one another, or at least very close to one another. There is no cooling segment arranged between them. FIG. 3 shows, in this situation only in sections, a transfer region between the stretch-blowing machine 12 and a carousel or star of a circulating filling machine 14, driven such as to rotate.

By way of example, container preforms 15 are delivered to the stretch-blowing machine 12, which preforms 15 are blown on the stretch-blowing machine 12 under heat to a container shape, in particular a bottle shape. As an alternative, the process of container production can also begin with the delivery of PET pellets. The still hot or heated bottles are transferred by way of a simple transport or conveying elements 22, such as transport stars or conveying stars or starwheels, to the filling machine 14 directly downstream.

FIG. 4 shows another possible exemplary embodiment of a device for the filling of containers 25, which device comprises a stretch-blowing machine 12 for producing PET bottles. With the device according to FIG. 4, the delivery of the first product component C1 to the filling element and the delivery of the second product component C2 to the filling element take place separately from one another, wherein, for this purpose, an additional bypass line is provided for the delivery of the first product component C1. For example, the delivery of the second product component C2 is carried out via an annular reservoir 16 with associated delivery lines, and the delivery of the second product component C2 via an additional annular channel with associated delivery lines.

According to the example from FIG. 4, a cooling arrangement 26 is further provided for the cooling of the first product component C1. The cooling arrangement 26 cools the first product component C1, before or during the delivery to the filling element, to a temperature below the ambient temperature, for example to a temperature of just above 0° C., or from 1° C. to 15° C., or from 2° C. to 10° C., or from 4° C. to 8° C. The cooling arrangement 26 can comprise, for example, cooling sleeves, cooling jackets, or throughflow coolers, or other similar cooling devices suitable for container filling or beverage bottling. By the cooling of the first product component C1, the cooling effect on hot containers can be enhanced beyond the cooling effect provided by a first product component C1 that is warmer or not cooled.

In the exemplary embodiments described, the first filling phase takes place in each case as contactless filling at ambient pressure. As an alternative, however, also with appropriately configured filling elements 28, with controlled filling valves, as the first filling phase, filling can take place under low pressure. In this situation, for example, a dispensing opening of the filling element can be connected, even during the first filling phase, to the container opening 24 in a gas-tight manner by way of a sleeve, for example, wherein the filling element is provided with a return gas channel and a line with gas under pressure. By way of the controlling and/or regulating of the return gas channel and of the line with gas under pressure, the pressure in the interior of the container can be individually controlled during the filling. The same also applies to the second filling phase.

FIG. 5a shows, in a perspective representation, the base of a container 35. The vertical axis HA passes vertically through an injection point 32, which is covered or submerged in a volume of the first product component C1. The volume of the first product component C1 is such that the fill level or surface is a distance above the injection point 32, i.e., is at a cover height, of approximately 3 mm, specifically 3.03 mm in FIG. 5a. The injection point 32 can be readily identified in the sectional drawing of FIG. 5b to FIG. 5a. The first product component C1 is filled in a geometry-dependent quantity, but always in such a manner that the injection point 32, as a section of the base, is reliably covered with the greatest quantity of material, and therefore the highest stored quantity of heat, with an adequate height of the product component C1. In the present example in FIG. 5b, a cover height of 6.70 mm pertains at the injection point 32 at the end of this first filling phase.

The following is at least a partial list of components shown in the figures and their related reference numerals: device for filling containers 10; stretch-blowing machine 12; filling machine 14; container preforms 15; product container or tank 16; storage container 16a; pressure control device 18; control device 17; source of gas under pressure 20; transport or conveying elements 22; container opening 24; container 25; cooling arrangement 26; filling element 28; container base 30; injection point or seam 32; covering height 33; first product component C1; second product component C2; first relative density measured in degrees Brix d1; second relative density measured in degrees Brix d2; vertical axis of contact HA; first pressure p1; second pressure p2.

At least one possible exemplary embodiment of the present application relates to a method for filling containers 25 with a carbon dioxide containing liquid product 30 with a given product carbon dioxide content, with which the containers 25 are transferred to a filling machine 14 with filling elements 28 and are filled by the filling elements 28 provided, wherein, as containers 25, use is made of plastic containers produced by stretch-blowing, such as polyethylene terephthalate (PET) containers, and wherein each container 25 is set under a first pressure p1 during the beginning of the filling in a first filling phase, and, in a second filling phase, the pressure in the container 25 is subsequently raised to at least one second pressure p2, wherein the still hot containers 25 coming from the stretch-blowing are transferred immediately after the stretch-blowing, without prior cooling by spraying and/or wetting with a gaseous and/or liquid cooling agent/mixture, to the filling machine 14, wherein in the first filling phase a volume of a first product component C1 with a first carbon dioxide content is delivered to the filling element 28, and is filled by the filling element 28 into the container, and that, in the second filling phase, a volume of a second component C2 with a same or a second carbon dioxide content is delivered to the filling element 28, and is filled by the filling element 28 into the container, wherein at least one of the two carbon dioxide contents of the product components C1, C2 is higher than the given product carbon dioxide content of the liquid product, and wherein the first filling phase and the second filling phase are matched to one another in such a way that the liquid product 30 in the complete filled container 25 exhibits the given product carbon dioxide content.

At least one possible exemplary embodiment of the present application relates to the method, wherein, in the first filling phase, a volume of a first product component C1 with a first carbon dioxide content is delivered to the filling element 28, and is filled by the filling element 28 into the container, and that, in the second filling phase, a volume of a second product component C2 with a second carbon dioxide content is delivered to the filling element 28, and is filled by the filling element 28 into the container, wherein at least the second carbon dioxide content of the second product component C2 is higher than that of the given product carbon dioxide content of the liquid product, and wherein the first filling phase and the second filling phase are matched to one another in such a way that the liquid product 30 in the complete filled container 25 exhibits the given product carbon dioxide content.

At least one possible exemplary embodiment of the present application relates to the method, wherein the first product component C1 exhibits a first relative density d1, measured in degrees Brix, and the second product component C2 exhibits a second relative density d2, a second relative density d2 measured in degrees Brix, wherein the first relative density d1 of the first product component C1 is lower than a given product value of the relative density of the liquid product 30, wherein the second relative density d2 of the second product component C2 is higher than the given product value of the relative density of the liquid product 30, and wherein the first and second relative densities d1, d2 are adjusted and set as a dependency of the respective volumes, filled in the first and second filling phases, of the first and second product components C1, C2, in such a way that the liquid product 30 in the completely filled container 25 exhibits the given product value of the relative density.

At least one possible exemplary embodiment of the present application relates to the method, wherein, as the first product component C1, a product component C1 is used which comprises a first carbon dioxide content, which is lower than the given product carbon dioxide content of the liquid product 30.

At least one possible exemplary embodiment of the present application relates to the method, wherein, as the first product component C1, a non-carbonated product component C1 is used, preferably a product water.

At least one possible exemplary embodiment of the present application relates to the method, wherein the first pressure p1 during the first filling phase corresponds to the ambient pressure.

At least one possible exemplary embodiment of the present application relates to the method, wherein, in the first filling phase, an increase in the pressure p1 to an increased next pressure greater than the pressure p1 takes place, in particular to the second pressure p2, by the sealing of the container against the ambient pressure and by the delivery of liquid.

At least one possible exemplary embodiment of the present application relates to the method, wherein, in the first filling phase, the increase in the pressure to a value greater than the pressure p1, in particular to the second pressure p2, takes place, namely a prestressing of the container 25, wherein this takes place at least at times simultaneously with the filling of the first product component C1 into the container 25.

At least one possible exemplary embodiment of the present application relates to the method, wherein, in the second filling phase, the increase in the pressure to the second pressure p2, namely a prestressing of the container 25, takes place simultaneously with the filling of the second product component C2 into the container 25.

At least one possible exemplary embodiment of the present application relates to the method, wherein, as containers 25, use is made of plastic containers produced by stretch-blowing, in particular PET containers, wherein the still hot containers 25 coming from the stretch-blowing are transferred immediately after the stretch-blowing to the filling machine 14, and in the first filling phase are filled at the first pressure p1 with the first product component C1, wherein the volume of the first product component C1 filled into the still hot container 25 is used for the cooling of the container, in particular of a container base, and amounts to a maximum of 30% of a total reference or target quantity.

At least one possible exemplary embodiment of the present application relates to the method, wherein the volume of the first product component C1, filled into the container 25 in the first filling phase under the first pressure p1, amounts to 0.7% to 25%, preferably 1% to 20%, and particularly preferably 2% to 10% of a total reference or target quantity.

At least one possible exemplary embodiment of the present application relates to the method, wherein the container 25 comprises an injection point 32 in the region of the base 31, and in the first filling phase a first product component C1 is filled in a covering height 33 of at least 1.5 mm over the inner container surface above the injection point 32, ideally in a covering height 33 greater than or equal to 5 mm.

At least one possible exemplary embodiment of the present application relates to the method, wherein the first product component C1 is cooled before and/or during the delivery to the filling element 28.

At least one possible exemplary embodiment of the present application relates to the method, wherein the first product component C1 is delivered to the filling element 28 by a bypass line.

At least one other possible exemplary embodiment of the present application relates to a device for filling containers 25 with a carbon dioxide-containing liquid product 30 with a given product carbon dioxide content, in particular for carrying out the method according to any one of the preceding claims, which device comprises a filling machine 14 with filling elements 28 for filling the containers 25, wherein the filling machine comprises at least one storage tank 16a for a first product component C1 and at least one product container 16 for a second product component C2, wherein each filling element 28 is connected by a delivery arrangement, controlled by a control device 17 provided, for delivering the first and second product components C1, C2, wherein each filling element 28 is also connected by a gas path, which can be controlled by a pressure control device 18 provided, to a source of gas under pressure 20, and is provided with a corresponding contact section for a sealing contact with a container opening 24 of the container 25, wherein the filling machine 14 is configured such that, by a respective liquid valve provided in the filling elements 28, it fills each of the containers 25 over a first filling phase and a second filling phase following the first, wherein the filling machine 14 is further configured such as to set each container 25 under a first pressure p1, by one of the filling elements 28 via the gas path which can be controlled by the pressure control device 18 for the first filling phase, and, by the associated liquid valve, under the first pressure p1, filling a volume of a first product component C1 with a first carbon dioxide content, and then setting the container 25, by the same filling element 28, for the second filling phase, under a second pressure p2, and, under the second pressure p2, filling a volume of a second product component C2 with a second carbon dioxide content.

At least one other possible exemplary embodiment of the present application relates to the device, wherein the device further comprises a stretch-blowing machine 12, wherein the filling machine 14 is arranged, without the intermediate provision of any further handling units, immediately next to the stretch-blowing machine 12 for manufacturing containers 25 produced by stretch-blowing, and that the filling machine 14 is designed so as to take over directly the containers 25 coming from the stretch-blowing machine.

At least one other possible exemplary embodiment of the present application relates to the device, wherein the device further comprises at least one cooling arrangement for cooling the first product component C1.

At least one other possible exemplary embodiment of the present application relates to the device, wherein the device further comprises at least one bypass line for delivering the first product component C1 to the filling valves 28.

At least one other possible exemplary embodiment of the present application relates to the device, wherein the filling machine 14 is configured as a circulating driven filling machine 14 with a rotor, wherein, at the rotor of the filling machine 14 an annular reservoir is provided as a product container 16 for the provision and delivery of the second product component C2, and wherein an additional annular channel is further provided as a storage container 16*a* for the provision and supply of the first product component C1.

At least one possible exemplary embodiment of the present application relates to a method of filling beverage bottles with a beverage comprising soft drinks, soda, beer, or similar beverages, said method comprising the steps of: forming a beverage bottle in a beverage bottle forming arrangement configured to form beverage bottles; moving beverage bottles into a beverage bottle transport arrangement comprising at least one transport device comprising a linear conveyor belt or a rotary star wheel; transporting beverage bottles with said beverage bottle transport arrangement along a linear path or a rotary path; transporting beverage bottles to a beverage bottle filling or bottling machine configured to fill beverage bottles with a beverage; positioning each beverage bottle at a corresponding filling device of a plurality of filling devices of said beverage bottle filling machine; filling each of said beverage bottles with an amount of said beverage, which said beverage is a carbonated beverage comprising soft drinks, soda, beer, or similar beverages by: performing a first beverage filling phase by dispensing a first amount of a first beverage component into said beverage bottle under a first beverage filling pressure in said container; and performing a second beverage filling phase by dispensing a second amount of a second beverage component into said beverage bottle under a second beverage filling pressure in said container; configuring said first beverage filling phase and said second beverage filling phase to produce said beverage having a desired amount and carbonation by selecting the pressures in the beverage bottles and the amount and the carbonation of the first and second beverage components; and moving filled beverage bottles out of said beverage bottle filling machine and to another beverage bottle handling machine comprising a beverage bottle capping or closing machine.

At least one possible exemplary embodiment of the present application relates to the method, wherein: said beverage bottle filling machine is a rotary beverage bottle filling machine; said beverage bottle filling machine comprises a rotor configured to rotate about a central vertical axis of rotation; said beverage bottle filling devices are disposed on and about the perimeter of said rotor; and said method further comprises filling said beverage bottles with said beverage bottle filling devices while said rotor rotates.

At least one other possible exemplary embodiment of the present application relates to a method of filling containers, such as beverage bottles or similar containers, with a liquid product or beverage, such as soft drinks, soda, beer, or similar beverages, said method comprising the steps of: transferring a container comprising plastic material, while said container is heated or hot, from a stretch blow molding machine to a filling device of a filling machine without cooling said container with a cooling arrangement or cooling material; filling said container with a predetermined volume of liquid product having a predetermined carbon dioxide content by: performing a first filling phase by dispensing a first volume of a first liquid product component having a first carbon dioxide content into said container under a first pressure in said container; and performing a second filling phase by dispensing a second volume of a second liquid product component having a second carbon dioxide content into said container under at least one second pressure in said container; and configuring said first filling phase and said second filling phase to produce said liquid product having said predetermined volume and predetermined carbon dioxide content by: selecting said first liquid product component having said first carbon dioxide content, and selecting said second liquid product component having said second carbon dioxide content, wherein at least one of said first carbon dioxide content and said second carbon dioxide content being higher than said predetermined carbon dioxide content of said liquid product; selecting said first pressure to be present in said container during said first filling phase, and selecting said at least one second pressure, higher than said first pressure, to be present in said container during a second filling phase; and selecting said first volume of said first liquid product component to be dispensed into said container during said first filling phase, and selecting said second volume of said second liquid product component to be dispensed into said container during said second filling phase.

At least one other possible exemplary embodiment of the present application relates to the method, wherein said at least one second carbon dioxide content of said second liquid product component is higher than said predetermined carbon dioxide content of said liquid product.

At least one other possible exemplary embodiment of the present application relates to the method, wherein: said first liquid product component has a first relative density measured in degrees Brix; said second liquid product component has a second relative density measured in degrees Brix; said liquid product has a predetermined relative density measured in degrees Brix; said first relative density is lower than said predetermined relative density, and said second relative density is higher than said predetermined relative density; and said method further comprises selecting said first and second relative densities with respect to said first and second volumes of said first and second liquid product components to produce said liquid product with said predetermined relative density.

At least one other possible exemplary embodiment of the present application relates to the method, wherein said first carbon dioxide content of said first liquid product component is lower than said predetermined carbon dioxide content of said liquid product.

At least one other possible exemplary embodiment of the present application relates to the method, wherein said first liquid product component comprises a non-carbonated liquid product component or a product water.

At least one other possible exemplary embodiment of the present application relates to the method, wherein said first pressure during said first filling phase is equivalent or essentially similar to ambient pressure of the surrounding environment outside of said container.

At least one other possible exemplary embodiment of the present application relates to the method, wherein: said method further comprises moving a mouth of said container into sealing engagement with its filling device and increasing pressure inside said container from said first pressure to said at least one second pressure; and said step of moving said container mouth into sealing engagement is performed either: during said first filling phase, either during or after dispensing of said first liquid product component, to thereby increase the pressure inside said container to an intermediate pressure higher than said first pressure or to said at least one second pressure; or during said second filling phase, either before or during dispensing of said second liquid product component, to thereby increase the pressure inside said container to said at least one second pressure.

At least one other possible exemplary embodiment of the present application relates to the method, wherein: said step of transferring said container to said filling machine comprises immediately transferring heated or hot plastic containers from said stretch blow molding machine to said filling machine; and said first filling phase comprises cooling at least a container base of said heated or hot container with said first liquid product component, wherein said first volume is at most 30% of said predetermined volume of said liquid product.

At least one other possible exemplary embodiment of the present application relates to the method, wherein said step of selecting said first volume of said first liquid product component comprises a selecting a first volume that is a percentage of said predetermined volume of said liquid product, wherein said percentage is one of: 0.7% to 25% of said predetermined volume of said liquid product; 1% to 20% of said predetermined volume of said liquid product; or 2% to 10% of said predetermined volume of said liquid product.

At least one other possible exemplary embodiment of the present application relates to the method, wherein said container comprises a stretch blow molding injection point in said container base, and said first filling phase comprises dispensing said first liquid product component such that said first liquid product component reaches a fill level that is at least 1.5 mm above said injection point, or at least 5 mm above said injection point.

At least one other possible exemplary embodiment of the present application relates to the method, wherein said method further comprises cooling said first liquid product component before and/or during delivery to said filling device via a bypass line.

At least one other possible exemplary embodiment of the present application relates to the method, wherein said first filling phase comprises: positioning said container under a corresponding filling device with a mouth of said container a distance from a dispensing opening of said filling device; dispensing said first liquid product component into said container under ambient pressure or the pressure of the surrounding environment and permitting any carbon dioxide in said first liquid product to escape out of said container mouth into the surrounding environment; and cooling, with said first liquid product component, at least a base portion of said container to thereby stiffen said plastic material to minimize deformation of said base portion out of a predetermined shape and design by forces exerted by said at least one second pressure in said second filling phase.

At least one other possible exemplary embodiment of the present application relates to the method, wherein said first filling phase comprises: after or during dispensing of said first liquid product, moving said container mouth into sealing engagement with said dispensing opening of said filling device; and increasing the pressure inside said container from said first pressure to said at least one second pressure before beginning said second filling phase.

At least one possible exemplary embodiment of the present application relates to a container filling arrangement configured to fill containers, such as beverage bottles or similar containers, with a liquid product or beverage, such as soft drinks, soda, beer, or similar beverages, according to the method in at least one possible exemplary embodiment, said device comprising: a filling machine comprising filling devices configured to fill containers with a liquid product; said filling machine comprising at least one storage tank configured to store a first liquid product component; said filling machine comprising at least one product container configured to store a second liquid product component; said filling machine comprising a delivery arrangement controlled by a control device and connected to each of said filling devices to permit delivery of said first and second liquid product components to said filling devices; a source of gas under pressure and a pressure control device configured to control gas pressure; gas channels being configured and disposed to connect said source of gas to said filling devices; each of said filling devices comprising a dispensing portion configured to be brought into sealing engagement with a mouth of a container; each of said filling devices comprising a filling valve to control filling of containers with a liquid product in a first filling phase and a second filling phase; upon said first filling phase, said filling valve being configured to dispense a first volume of a first liquid product component having a first carbon dioxide content into said container, and said pressure control device being configured to control gas pressure such that said container is under a first pressure; and upon said second filling phase, said filling valve being configured to dispense a second volume of a second liquid product component having a second carbon dioxide content into said container, and said pressure control device being configured to control gas pressure such that said container is under at least one second pressure.

At least one possible exemplary embodiment of the present application relates to the container filling arrangement, wherein: said container filling arrangement further comprises a stretch blow molding machine configured to form plastic containers by stretch blow molding; said filling machine is disposed immediately downstream of said stretch blow molding machine without any other container treatment machines there between, such that said filling machine is disposed to receive containers essentially directly from said stretch blow molding machine upon formation thereof.

At least one possible exemplary embodiment of the present application relates to the container filling arrangement, further comprising at least one cooling arrangement for cooling the first liquid product component prior to dispensing.

At least one possible exemplary embodiment of the present application relates to the container filling arrangement, further comprising at least one bypass line to permit delivery of the first liquid product component to said filling devices.

At least one possible exemplary embodiment of the present application relates to the container filling arrangement, wherein: said filling machine is a rotary filling machine comprising a rotor; said rotary filling machine comprises an annular reservoir disposed at said rotor and configured to store and deliver the second liquid product component; and said rotary filling machine comprises an additional annular channel configured to form a storage container for provision and supply of the first liquid product component.

The entirety of the appended drawings, including all dimensions, proportions, and/or shapes disclosed thereby or reasonably understood therefrom, are hereby incorporated by reference.

All of the patents, patent applications, patent publications, and other documents cited herein, are hereby incorporated by reference as if set forth in their entirety herein.

The corresponding foreign or international patent applications, as originally filed and as published, from which the present application claims the benefit of priority, are hereby incorporated by reference as if set forth in their entirety herein, as follows: PCT/EP2019/063315 and DE 102018119550.

The following patents, patent applications, patent publications, and other documents cited in the corresponding foreign or international patent applications listed in the preceding paragraph are hereby incorporated by reference as if set forth in their entirety herein: WO 2017/093078 A1; U.S. Pat. No. 2,372,899 A; DE 102012104267 A1; U.S. Pat. Nos. 5,996,322 A; and 5,642,761 A.

Although the invention has been described in detail for the purpose of illustration of any embodiments disclosed herein, including the most practical or preferred embodiments at the time of filing of this application, it is to be understood that such detail is solely for that purpose and that the invention is not limited to such embodiments, but, on the contrary, is intended to cover modifications and equivalent arrangements that are within the spirit and scope of the present application, including the specification and the claims as originally filed, as amended, or as issued. For example, it is to be understood that the present invention contemplates that, to the extent possible, one or more features or components of any disclosed embodiment can be combined with one or more features or components of any other disclosed embodiment.

What is claimed is:

1. A method of filling containers, such as beverage bottles or similar containers, with a liquid product or beverage, such as soft drinks, soda, beer, or similar beverages, said method comprising the steps of:
   transferring a container comprising plastic material, while said container is heated or hot, from a stretch blow molding machine to a filling device of a filling machine without cooling said container with a cooling arrangement or cooling material;
   filling said container with a predetermined volume of liquid product having a predetermined carbon dioxide content by:
      performing a first filling phase by dispensing a first volume of a first liquid product component having a first carbon dioxide content from a storage container into said container under a first pressure in said container; and
      performing a second filling phase by dispensing a second volume of a second liquid product component having a second carbon dioxide content from a product container into said container under at least one second pressure in said container; and
      configuring said first filling phase and said second filling phase to produce said liquid product having said predetermined volume and predetermined carbon dioxide content by:
      selecting said first liquid product component having said first carbon dioxide content, and selecting said second liquid product component having said second carbon dioxide content, wherein at least one of said first carbon dioxide content and said second carbon dioxide content is higher than said predetermined carbon dioxide content of said liquid product;
      selecting said first pressure to be present in said container during said first filling phase, and selecting said at least one second pressure, higher than said first pressure, to be present in said container during a second filling phase;
      selecting said first volume of said first liquid product component to be dispensed into said container during said first filling phase, and selecting said second volume of said second liquid product component to be dispensed into said container during said second filling phase; and
      matching said first filling phase and said second filling phase to one another to produce the predetermined volume of the liquid product in the container with the predetermined carbon dioxide content.

2. The method according to claim 1, wherein said at least one second carbon dioxide content of said second liquid product component is higher than said predetermined carbon dioxide content of said liquid product.

3. The method according to claim 2, wherein:
   said first liquid product component has a first relative density measured in degrees Brix;
   said second liquid product component has a second relative density measured in degrees Brix;
   said liquid product has a predetermined relative density measured in degrees Brix;
   said first relative density is lower than said predetermined relative density, and said second relative density is higher than said predetermined relative density; and
   said method further comprises selecting said first and second relative densities with respect to said first and second volumes of said first and second liquid product components to produce said liquid product with said predetermined relative density.

4. The method according to claim 3, wherein said first carbon dioxide content of said first liquid product component is lower than said predetermined carbon dioxide content of said liquid product.

5. The method according to claim 4, wherein said first liquid product component comprises a non-carbonated liquid product component or a product water.

6. The method according to claim 5, wherein said first pressure during said first filling phase is equivalent or essentially similar to ambient pressure of the surrounding environment outside of said container.

7. The method according to claim 6, wherein:
   said method further comprises moving a mouth of said container into sealing engagement with its filling device and increasing pressure inside said container from said first pressure to said at least one second pressure; and
   said step of moving said container mouth into sealing engagement is performed either:
      during said first filling phase, either during or after dispensing of said first liquid product component, to thereby increase the pressure inside said container to an intermediate pressure higher than said first pressure or to said at least one second pressure; or
      during said second filling phase, either before or during dispensing of said second liquid product component, to thereby increase the pressure inside said container to said at least one second pressure.

8. The method according to claim 7, wherein:
   said step of transferring said container to said filling machine comprises immediately transferring heated or hot plastic containers from said stretch blow molding machine to said filling machine; and
   said first filling phase comprises cooling at least a container base of said heated or hot container with said first liquid product component, wherein said first volume is at most 30% of said predetermined volume of said liquid product.

9. The method according to claim 8, wherein said step of selecting said first volume of said first liquid product component comprises a selecting a first volume that is a percentage of said predetermined volume of said liquid product, wherein said percentage is one of:
- 0.7% to 25% of said predetermined volume of said liquid product;
- 1% to 20% of said predetermined volume of said liquid product; or
- 2% to 10% of said predetermined volume of said liquid product.

10. The method according to claim 9, wherein said container comprises a stretch blow molding injection point in said container base, and said first filling phase comprises dispensing said first liquid product component such that said first liquid product component reaches a fill level that is at least 1.5 mm above said injection point, or at least 5 mm above said injection point.

11. The method according to claim 10, wherein said method further comprises cooling said first liquid product component before and/or during delivery to said filling device via a bypass line.

12. The method according to claim 2, wherein said first filling phase comprises:
- positioning said container under a corresponding filling device with a mouth of said container a distance from a dispensing opening of said filling device;
- dispensing said first liquid product component into said container under ambient pressure or the pressure of the surrounding environment and permitting any carbon dioxide in said first liquid product to escape out of said container mouth into the surrounding environment; and
- cooling, with said first liquid product component, at least a base portion of said container to thereby stiffen said plastic material to minimize deformation of said base portion out of a predetermined shape and design by forces exerted by said at least one second pressure in said second filling phase.

13. The method according to claim 12, wherein said first filling phase comprises:
- after or during dispensing of said first liquid product, moving said container mouth into sealing engagement with said dispensing opening of said filling device; and
- increasing the pressure inside said filling container from said first pressure to said at least one second pressure before beginning said second filling phase.

14. A container filling arrangement configured to fill containers, such as beverage bottles or similar containers, with a liquid product or beverage, such as soft drinks, soda, beer, or similar beverages, according to the method of claim 1, said device comprising:
- a filling machine comprising filling devices configured to fill containers with a liquid product;
- said filling machine comprising at least one storage tank configured to store a first liquid product component;
- said filling machine comprising at least one product container configured to store a second liquid product component;
- said filling machine comprising a delivery arrangement controlled by a control device and connected to each of said filling devices to permit delivery of said first and second liquid product components to said filling devices;
- a source of gas under pressure and a pressure control device configured to control gas pressure;
- gas channels being configured and disposed to connect said source of gas to said filling devices;
- each of said filling devices comprising a dispensing portion configured to be brought into sealing engagement with a mouth of a container;
- each of said filling devices comprising a filling valve to control filling of containers with a liquid product in a first filling phase and a second filling phase;
- upon said first filling phase, said filling valve being configured to dispense a first volume of a first liquid product component having a first carbon dioxide content into said container, and said pressure control device being configured to control gas pressure such that said container is under a first pressure; and
- upon said second filling phase, said filling valve being configured to dispense a second volume of a second liquid product component having a second carbon dioxide content into said container, and said pressure control device being configured to control gas pressure such that said container is under at least one second pressure; and
- said container filling arrangement further comprises a stretch blow molding machine configured to form plastic containers by stretch blow molding;
- said filling machine is disposed immediately downstream of said stretch blow molding machine without any other container treatment machines there between, such that said filling machine is disposed to receive containers essentially directly from said stretch blow molding machine upon formation thereof.

15. The container filling arrangement according to claim 14, further comprising at least one cooling arrangement for cooling the first liquid product component prior to dispensing.

16. The container filling arrangement according to claim 15, further comprising at least one bypass line to permit delivery of the first liquid product component to said filling devices.

17. The container filling arrangement according to claim 16, wherein:
- said filling machine is a rotary filling machine comprising a rotor;
- said rotary filling machine comprises an annular reservoir disposed at said rotor and configured to store and deliver the second liquid product component; and
- said rotary filling machine comprises an additional annular channel configured to form a storage container for provision and supply of the first liquid product component.

* * * * *